April 21, 1942.     D. E. HOLLOWAY ET AL     2,280,583
AIRCRAFT COCKPIT ENCLOSURE
Filed Jan. 11, 1940
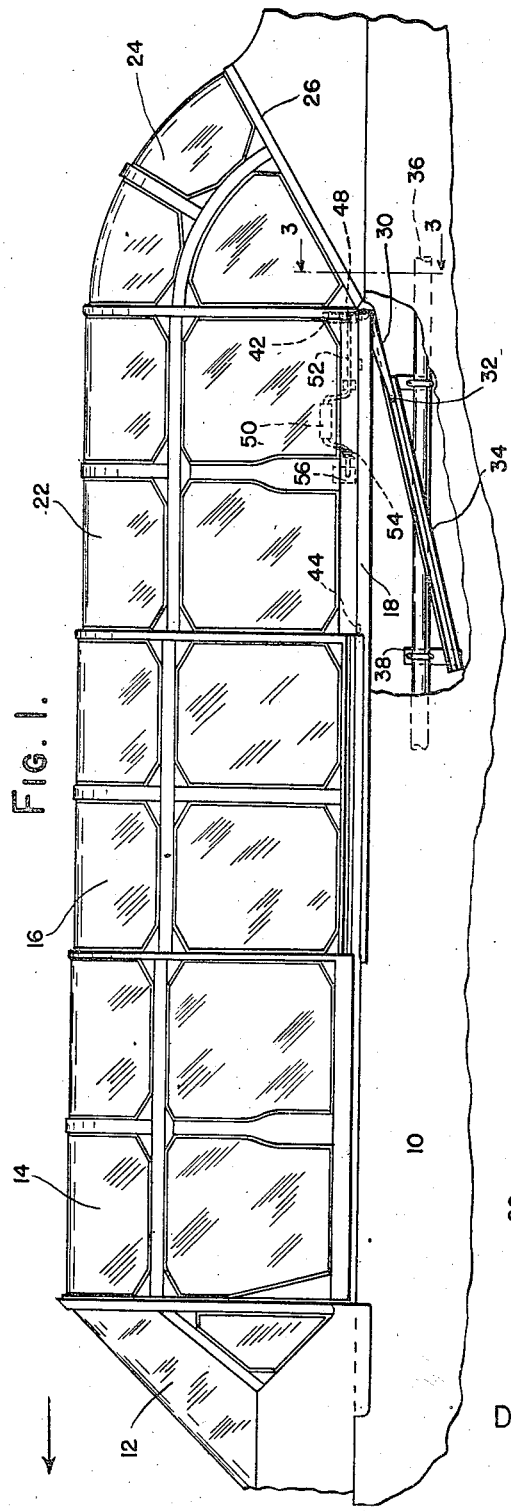
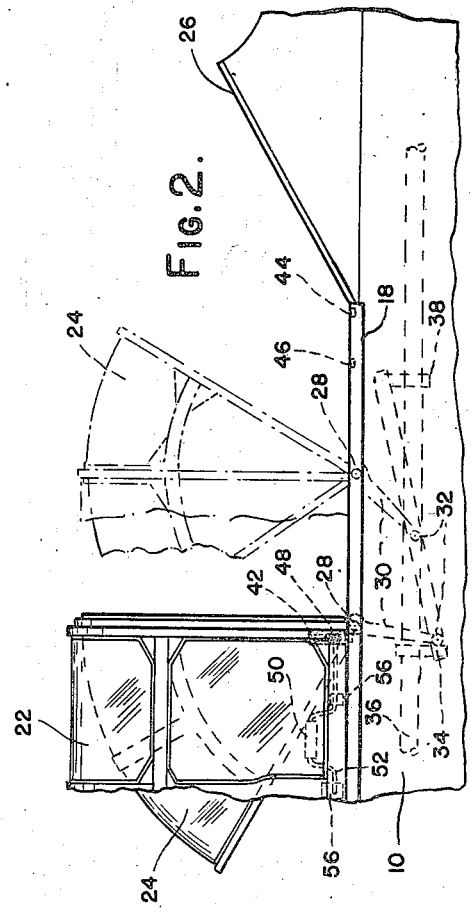
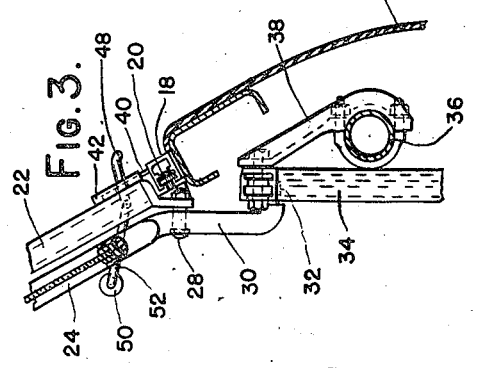
INVENTORS.
DANIEL E. HOLLOWAY & J. STANLEY SMITHSON
BY James M. Clark
ATTORNEY.

Patented Apr. 21, 1942

2,280,583

UNITED STATES PATENT OFFICE 2,280,583

AIRCRAFT COCKPIT ENCLOSURE

Daniel E. Holloway, Inglewood, and James Stanley Smithson, Beverly Hills, Calif., assignors to North American Aviation, Inc., a corporation of Delaware Application January 11, 1940, Serial No. 313,318

7 Claims. (Cl. 244—121)

This invention relates to the operation and arrangement of multisection sliding enclosures or cover members and more particularly to cockpit enclosures for use in aircraft.

A principal object of this invention is to simplify the operation of a series of associated telescoping enclosure members, such as the sections of an aircraft cabin enclosure, by providing automatic mechanism whereby an interlinked series of telescoping members may be controlled and locked in all positions by a single, manually operated lock. This eliminates the necessity of having separately operable locks for each movable section in the series. Another object is to provide a terminal closure section of suitable form to fair the cockpit enclosure into the aft end of the aircraft fuselage and to render this terminal section movable so as to uncover the portion of the cockpit normally lying therebeneath.

Still another object is to make such a terminal closure section operable as an automatic result of operation of a slidable section of the cockpit enclosure. A further object is to provide a simple, sturdy mechanism for the accomplishment of the objects described which will adequately perform its allotted function and which will prove reliable under all operating conditions.

Still further objects will become apparent during a reading of the appended specification and claims when taken in conjunction with an examination of the accompanying drawing, in which:

Fig. 1 is a partial side elevation of an aircraft fuselage provided with a transparent multisection cockpit enclosure in its completely closed position;

Fig. 2 is a fragmentary view similar to Fig. 1 showing the rear sliding sections of the enclosure in mid- and full-open positions; and Fig. 3 is a partial cross sectional view taken in the line 3—3 of Fig. 1, through the far side of the fuselage, showing part of the operating mechanism.

Referring to the drawing, there is shown a portion of an aircraft fuselage generally designated by the numeral 10. The portion illustrated is of a military type aircraft, although not necessarily limited thereto, and includes a forwardly located pilot station and in tandem therewith a rearwardly located station for a gunner, observer, or other occupant. To protect the forward crew station from the direct blast of the relative airstream as the aircraft moves in the direction of the arrow, a fixed transparent windshield 12 is provided which acts to direct the airstream upwardly and outwardly of the cockpit. In accordance with modern development, it is now the practice to provide additional protection from the elements, especially to allow heating of the cockpit, by totally enclosing it with a transparent canopy. To provide means of access to the forward or pilot cockpit station, a section 14 of the transparent enclosure is mounted on trackways by means of rollers adapted for engagement therewith so that the section 14 may be slid aft over an intermediate fixed section 16 to uncover the pilot cockpit. This section 16 is preferably formed with transparent panels to increase the field of vision from the cockpit and since it is entirely open interiorly from front to rear, communication between the fore and aft crew stations is facilitated.

The rear crew station is likewise provided with means for ingress and egress by having its closure section slidable on guideways or tracks 18 through the intermediacy of a set of rollers 20 carried by the slidable section (see Fig. 3). However, since the rear crew station usually is provided with an internally mounted machine gun, and in addition may have aerial photographic operations conducted therefrom, it is essential that these operations be unrestricted by any interference with the cockpit enclosure and hence, a relatively long opening must be provided for use when necessary. In order that there be no interference with the front slidable section 14, which it will be remembered, slides rearwardly over the intermediate section 16, the rear sliding section 22—24 is dimensioned transversely such that when it is moved forwardly it will slide under and within the section 16. Furthermore, in order to prevent this relatively long rear section from extending forwardly far enough to restrict free access to the forward crew station, it is made in two, or more, parts which can telescope together and thus occupy a lesser amount of space as measured longitudinally of the fuselage.

In the embodiment shown, the rear sliding section as distinguished from the front sliding section 14, is formed of two telescoping sections 22 and 24 respectively. The latter of these sections is of a sector shape as seen in side elevation in which form it is adapted to provide a smooth transition from the shape of section 22 to that of the sloped coaming 26 of the rear fuselage portion. As shown, this section 24 is dimensioned transversely such that when moved forwardly it will rotate or swing under and within the section 22. It will be seen that the only relative movement occurring between sections 22 and 24 is a pivotal movement of the latter and this is provided for by having the section 24 mounted within section 22 by means of a pair of pivot bolts 28, one of which is shown in Fig. 3.

According to our invention, the gunner's hood or section 24, is caused to pivot into or out of the section 22 as a direct result of fore and aft sliding movement of the latter. This automatic pivoting action occurs due to the fact that enclosure section 24 is fitted on one or both sides with rigid arms 30 terminally equipped with a cam follower in the form of a simple roller 32. This roller operates in a suitably shaped guide or trackway 34, an important feature of which is its relative position with respect to the fore and aft direction of sliding of closure section 22. As shown, it diverges therefrom at a slight angle in the forward direction and as a result of this the section 24 is caused to rotate when it and section 22 are slid forwardly as a unit. Such rotation is due to the angular divergence just mentioned, the vertical distance between bolt 28 and roller 32 increasing as the two are moved forwardly, and vice versa. Because the arm 30 is a rigid member, the centers of the points 28 and 32 are rigid and cannot actually approach each other and the only way the change in vertical spacing can be accommodated is for the arm in question to rotate about pivot bolt 28.

The trackway 34 is mounted on a convenient longitudinal member 36 of the fuselage by means of the bracketed clamps 38. The angle of divergence and other dimensions of the track are so chosen that beginning in the full closed position shown in Fig. 1, the section 24 begins to pivot with initial forward translational movement of section 22, and opens at a constant speed in relation thereto. At the mid-position shown in dotted lines in Fig. 2, section 24 is halfway received or telescoped into section 22. Similarly, when section 22 has reached its limiting forward position, then section 24 is fully telescoped therein and the rear cockpit station is then fully uncovered.

When a plurality of sliding sections are employed, it materially facilitates their operation if only one manually operated lock can be utilized to control the relative positions of the closure sections comprising a series between their full open and full closed positions. As before stated, it is a purpose of this invention to provide means interlinking the separate sections 22 and 24 for operation as a unit and this is in part accomplished by having a single, manually operated lock fixed to one of the sliding closure sections, as for instance the section 22. A suitable lock comprises a substantially vertically slidable bolt 40 (see Fig. 3) operating in a sleeve 42. Slots 44 are cut into the upper surface of trackway 18 to receive this bolt and as many such slots as may be desired can be provided. Terminal slots 44 are shown at each end of the track and for simplicity in the drawing only one intermediate slot 46 is shown. This latter slot allows the enclosure to be latched in a slightly open position to provide for ventilation. Operation of the lock may be accomplished either externally or internally of the cockpit inasmuch as an external lever 48 is provided as well as an internally mounted rotatable handgrip 50. Both of these are operable parts of a suitably bent rod 52 which is mounted in bearings 56 on the closure section 22. The rod is so formed that rotation thereof in one direction forces the bolt 40 vertically upward to unlock the closure sections and vice versa. In order to make locking automatic and positive a coil spring 54 (see Fig. 1) is coaxially fitted about rod 52.

While we have described our invention in detail in its present preferred embodiment and with special reference to its application to an aircraft cockpit enclosure, it will be understood by those skilled in the art, after understanding our invention, that various changes and modifications as well as other embodiments may be made without departing from the spirit or scope thereof. We aim in the appended claims to cover all such modifications and changes.

We claim as our invention:

1. In an aircraft cockpit fitted with trackways disposed along opposite sides thereof, the combination of a sliding enclosure section movable between limit points representing the effective length of said trackways, a second enclosure section mounted for pivotal movement between open and closed positions, and means of organization between said closure sections causing such pivotal movement to occur in direct proportion to the sliding movement of said first named enclosure section betwen said limit points, the said means comprising a guide disposed in non-parallel relation to said trackways and a rigid extension of said second enclosure section having operative engagement with said guide.

2. In an aircraft in combination, a series of telescoping cockpit enclosure sections, mounting means for one of said sections providing translational movement thereof, mounting means for another of said sections adapted for rotational movement thereof, means interconnecting said aircraft and said section mounted for rotational movement, to cause such movement concomitant with said translational movement, lock means organized to hold said sections relatively fixed with respect to each other comprising a lock operator having hand grips disposed interiorly and exteriorly of said enclosure and lock mechanism operated thereby to engage successive notches formed in a portion of the first said mounting means.

3. In an aircraft cockpit enclosure, the combination of a series of telescoping enclosure sections, each enclosure section comprising a rigid framework, mounting means for said enclosure sections comprising a plurality of rollers extending from opposed edges of said enclosure, enclosed tracks receiving said rollers, additional mounting means carried by one of said sections for the pivotal mounting thereon of another of said sections, means to cause relative pivotal movement between said described sections concomitant with translational movement of said rollers comprising a substantially linear guide disposed in divergent relationship to said tracks, a rigid arm extending from the pivotally mounted enclosure section into operative relationship with said guide, and single lock means operating in conjunction with said arm to releasably hold said sections relatively fixed with respect to each other and with respect to said aircraft.

4. In an aircraft cockpit enclosure, the combination of a pair of telescoping enclosure sections each comprising a rigid framework glazed with transparent panels, fixed trackways and associated rollers on one of said enclosure sections providing for translational movement thereof, a mounting carried by said section for the pivotal support thereon of the other section of said pair, means to cause relative pivotal movement between the sections concomitant with said translational movement comprising a substantially linear guide disposed to extend forwardly and downwardly with respect to said trackways, a rigid extension of said other section constrained to follow said guide and a lock operating to releasably hold said sections against said translational movement, said lock also operating through said means to prevent relative rotation between said sections.

5. In an aircraft cockpit enclosure, the combination of a pair of telescoping enclosure sections, fixed trackways and associated rollers on one of said enclosure sections providing for translational movement of said pair, a mounting carried by said section for the pivotal support thereon of the other section of said pair, means to cause relative pivotal movement between said sections comprising a guideway fixedly mounted on said aircraft spaced from and in non-parallel relationship to said trackways, cam means carried by the pivotally mounted enclosure section for engagement with said guideway and a lock arrangement organized to permit locking of said sections in a plurality of relative positions.

6. A cockpit enclosure for aircraft comprising a rigid enclosure section mounted for translational movement, a second rigid enclosure section pivotally mounted on said first section adapted to swing beneath for projection therefrom, a linear guide mounted within the aircraft to extend at an angle to the direction of said translational movement and a rigid operating member extending from said second enclosure section to slidably engage said guide for the purpose of causing continuous pivotal movement of said second section with respect to the first when the enclosure is subjected to translational movement.

7. In an aircraft body, a cockpit opening, a rigid transparent cockpit enclosure comprising at least one section mounted for translational movement, a second arcuate section mounted for pivotal movement with respect to said cockpit opening, enclosed trackways formed along opposed edges of said opening, rollers operating in said trackways adapted to carry said enclosure, a member extending from said arcuate section and a linear guide fixed in the interior of said body for engagement by said member to cause pivotal movement of the arcuate section upon translational movement of the enclosure.

DANIEL E. HOLLOWAY.
JAMES STANLEY SMITHSON.